United States Patent [19]

Rasmussen et al.

[11] Patent Number: 4,492,549
[45] Date of Patent: * Jan. 8, 1985

[54] COEXTRUSION DIE

[75] Inventors: Ole-Bendt Rasmussen, Mundschöpfiweg, Walchwil/Zug CH-6318, Switzerland; Bǿrge Jensen, Virum, Denmark

[73] Assignee: Ole-Bendt Rasmussen Rasmussen, Walchwil/Zug, Switzerland

[*] Notice: The portion of the term of this patent subsequent to Sep. 13, 2000 has been disclaimed.

[21] Appl. No.: 480,311

[22] Filed: Mar. 30, 1983

Related U.S. Application Data

[62] Division of Ser. No. 314,070, filed as PCT DK 81/00023, Feb. 27, 1981, published as WO 81/02406, Sep. 3, 1981, § 102(3) date Oct. 20, 1981, No. 4,403,934.

[30] Foreign Application Priority Data

Feb. 29, 1980 [DK] Denmark .............................. 891/80

[51] Int. Cl.³ ............................................... B29F 3/04
[52] U.S. Cl. ................................ 425/131.1; 264/173; 425/133.1; 425/192 R; 425/462
[58] Field of Search ............... 425/131.1, 133.1, 462, 425/192 R; 264/173, 514; 156/244.13, 244.14, 500

[56] References Cited

U.S. PATENT DOCUMENTS

| 2,820,249 | 1/1958 | Colombo | 425/133.1 |
| 3,418,687 | 12/1968 | Albert | 425/380 |
| 3,649,143 | 3/1972 | Papesh et al. | 425/133.1 |
| 3,756,758 | 9/1973 | Prall | 425/467 |
| 3,809,515 | 5/1974 | Farrell | 425/467 |
| 3,890,083 | 6/1975 | St. Eve | 425/133.1 |
| 4,167,383 | 9/1979 | Murakami et al. | 425/133.1 |
| 4,182,603 | 1/1980 | Knittel | 425/133.1 |
| 4,185,954 | 1/1980 | Murakami et al. | 425/133.1 |
| 4,201,532 | 5/1980 | Cole | 425/467 |
| 4,268,239 | 5/1981 | Herrington, Jr. | 425/467 |
| 4,368,017 | 1/1983 | Rasmussen | 425/133.1 |
| 4,403,934 | 9/1983 | Rasmussen et al. | 425/133.1 |

FOREIGN PATENT DOCUMENTS 1384979 2/1975 United Kingdom ............ 425/133.1

Primary Examiner—Jeffery Thurlow
Attorney, Agent, or Firm—William J. Daniel

[57] ABSTRACT

A coextrusion die for the extrusion of plastics materials in the shape of a tubular film comprising supply means for separately supplying at least two plastics materials to said die, a distribution channel system connected to each supply means, each distribution channel system comprising at least two arched channels provided in different axial planes, the ends of each arched channel being connected to the middle portion of the following arched channel and the distribution channel systems being located at different distances from the center axis of the die, collecting chambers communicating with said distribution channel systems and an annular extrusion slot communicating with the collecting chambers.

10 Claims, 4 Drawing Figures

COEXTRUSION DIE

This is a division of Ser. No. 314,070, filed as PCT DK 8/00023, Feb. 27, 1981, published as WO 81/02406, Sep 3, 1981, § 102(e) dated Oct. 20, 1981, now U.S. Pat. No. 4,403,934, issued Sept. 13, 1983.

TECHNICAL FIELD

This invention relates to an extrusion die for the coextrusion of plastics materials in the form of a tubular film, said apparatus comprising means for separately supplying at least two extrudable materials in fluid state, a system of distribution channels connected to each supply means to form partial streams of said extrudable materials, each system of distribution channels opening into an annular collecting chamber, and an annular extrusion slot communicating with said annular collecting chamber(s).

BACKGROUND ART

In a prior art coextrusion die of the above mentioned type each extrudable material is supplied in liquid state through a centrally located supply conduit which is connected to a system of radially extending distribution channels, each system being provided in a distribution plate, and is then passed into an annular collecting chamber from which it is passed into a common annular extrusion slot.

Due to the presence of the radially extending distribution channels in the prior art coextrusion there is insufficient space for the strong clamping bolts which are required to maintain the distribution plates sufficiently tensioned to avoid leakage of extrudable materials between said plates at high extrusion pressures.

The prior art supply system for extrudable materials comprising centrally located supply conduits also suffer from the drawback that it allows no space at the centre of the die for the provision of driving means when it is desired to rotate the inner and outer die parts relative to one another or for the provision of supply and discharge conduits for gaseous coolant, such as air to cool and expand the extruded tubular film. In the absence of such cooling, the production rate is considerably reduced.

The object of the invention is to provide a coextrusion die providing sufficient space for the provision of clamping bolts, means for rotating one of the die parts relative to one another and supply and discharge conduits for gaseous coolant.

DISCLOSURE OF INVENTION

According to the invention there is provided an extrusion die wherein the distribution channel system for each extrudable material comprises at least two arched channels provided in different axial planes, the ends of each arched channel being connected to the middle portion of the following arched channel and wherein the distribution channel systems are located at different distances from the centre axis of the extrusion die.

In the following the invention will be described with reference to an extrusion die for the coextrusion of three extrudable materials, wherein the arched distribution channels are circular arches and wherein the distribution channel systems are located concentrically because the use of such distribution channels and the concentric mounting of these systems are particularly advantageous as far as the manufacture of the extrusion die is concerned.

However, it should be understood that the die may comprise two or more than three distribution channel systems and that the arched distribution channels should not necessarily have the shape of circular arches and even may be composed of linear channel sections and that the distribution channel systems do not have to be concentrically mounted.

The invention is based on the discovery that by effecting the distribution of each extrudable material in a labyrinthic manner in different distances from the centre axis of the die and in different axial planes thereof, it is possible to avoid conduits for supplying extrudable materials to the die and radially extending distribution channels in the central zone of the die. Thus, the supply conduits can be connected to the end surface or exterior surface of the die and can be connected to the first arched channel of each distribution channel system through connection channels provided in the die.

Thus, the necessary clamping bolts can be inserted between the distribution channel systems and driving means, if any, for the rotation of the inner die part as well as conduits for gaseous coolant can be mounted in the central zone of the die.

By providing the distribution channel systems at different distances from the centre axis of the die, it is also possible to provide within the die drainage conduits for draining extruded material leaking from the distribution channels.

U.S. patent specification No. 3,698,988 discloses an extrusion die for the extrusion of a tubular film on a preformed tubular body. The prior art extrusion die which is no coextrusion die comprises a supply conduit for supplying a plastics material to a first arched distribution channel which is provided in a plate member. Each end of said first distribution channel is connected to a second arched distribution channel provided in an adjacent plate.

The ends of said latter distribution channel are connected to an annular inner distribution channel provided within the same plate and having a diameter which is less than that of the first and second distribution channels. Thus, the flow of material from said arched distribution channels to said annular distribution channel which opens into an annular extrusion die to a radial flow and not an axial flow.

The part of the extrusion die of the invention in which the distribution channels are provided preferably consists of elements which are clamped together and the arched channels are preferably formed from grooves provided in the surfaces of said elements.

An extrusion die composed of such elements presents several advantages as far as its manufacture is concerned. Thus, it is much simpler to form grooves in the surface of such elements than to form internal channels therein. Furthermore, it is easy to maintain and clean such a die because the elements can easily be replaced, and when the die has been disassembled the grooves forming the distribution channels are easily cleaned.

The arched distribution channels and the connecting channels connecting the ends of one arched channel with the middle portions of the following channels may have any cross-sectional shape. In practice, however, it has been found preferable to use channels having an essentially rectangular cross-sectional shape with rounded corners in order to obtain a uniform flow through said channels and to prevent a thermal conversion of slowly flowing material.

An embodiment of the extrusion die of the invention comprises arched distribution channels each formed from two grooves, one groove being formed in the surface of one element and the other in the surface of the adjacent element. This embodiment is particularly advantageous because it allows distribution channels having circular cross-section or having rounded corners to be formed in a simple manner.

In another preferred embodiment of the die of the invention the elements are disc-shaped and the arched channels are interconnected through connecting channels extending through the intermediate discs. Such disc-shaped elements are particularly preferred because they can be clamped together to form distribution channels without dead zones, even if the elements are warped e.g. as a result of a high temperature cleaning of the distribution channels.

The elements are preferably discs which extend perpendicular to the axis of the extrusion die and in that case the connecting channels preferably are parallel to said axis.

The portion of the extrusion die comprising the distribution channel system may also be composed of shell-shaped elements inserted in one another and the channels connecting the arched channels are preferably formed from grooves formed in the surfaces of the shell-shaped elements. Such a die is easily manufactured because all distribution channels of the distribution channel system can be formed by cutting.

A particularly uniform distribution of the extrudable material in the annular collecting chambers can be achieved by providing guide grooves at the points where the distribution channels open into the collecting chambers, said guide grooves being inclined relative to the centre axis of the die and the depth of said grooves gradually decreasing in the longitudinal direction of the die.

Due to the presence of said guide grooves the extrudable materials are subjected to a transverse movement after passing into the collecting chambers and said transverse movement contributes to the elimination or reduction of irregularities in the tubular bodies formed in the collecting chambers.

A similar effect is achieved by using an extrusion die in which at least one chamber wall in each collecting chamber is rotatable relative to the openings through which the distribution channels open into the collecting chamber considered.

The number and the length of the arched channels are preferably selected such that the channels through which a given distribution channel system is connected to a collecting chamber is uniformly distributed over the periphery of the collecting chamber. In this manner the extrudable material supplied to said collecting chamber is uniformly distributed over the whole periphery of the tubular film formed in the extrusion slot.

DETAILED DESCRIPTION OF THE PREFERRED EMBODIMENTS

Figure 1:
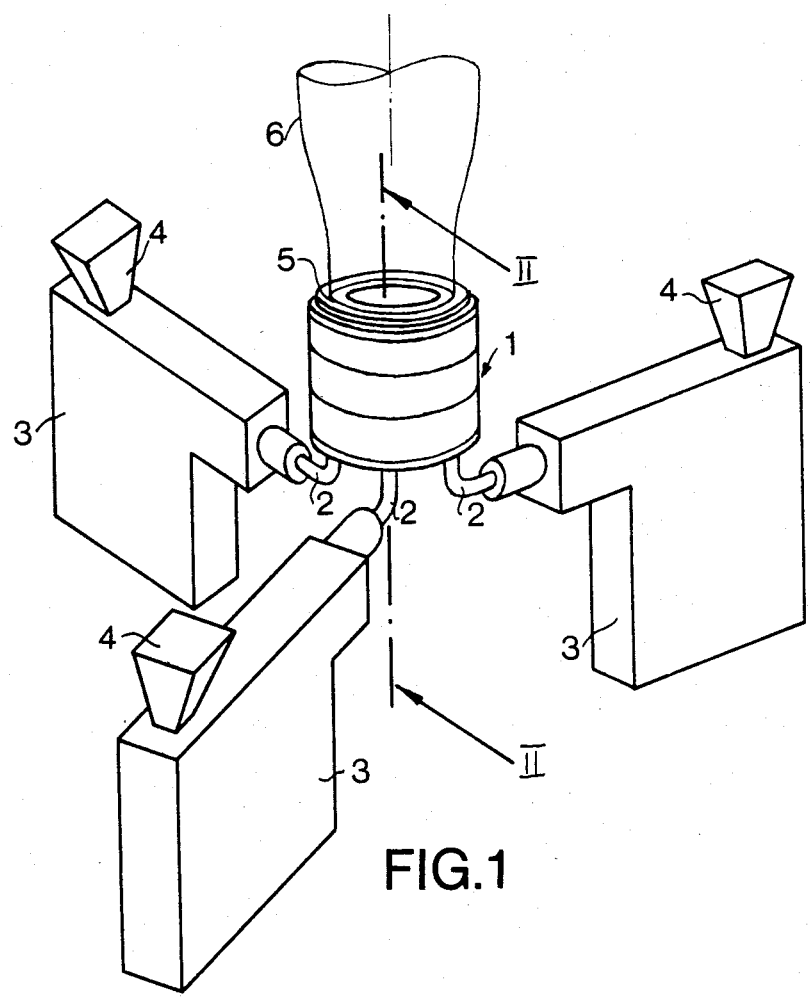
FIG. 1 is a diagrammatic perspective view of an embodiment of an extrusion die according to the invention fed by three extruders.

FIG. 1 illustrates a coextrusion die 1 which through supply conduits is fed by three extruders 3. Each extruder 3 comprises a supply funnel 4 for extrudable material. The extrusion die 1 has an annular extrusion slot 5 for the extrusion of a tubular film 6.

Figure 2:
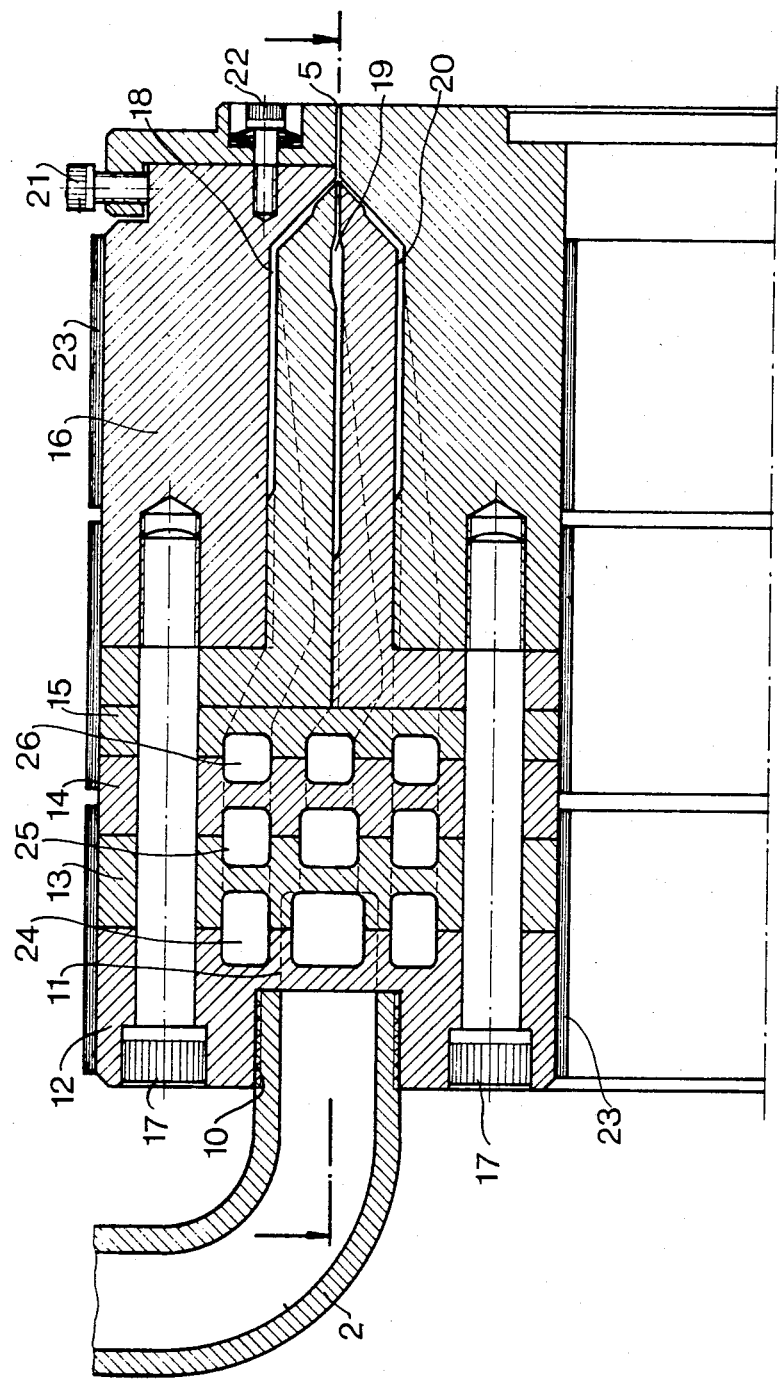
FIG. 2 is a longitudinal sectional view of the extrusion die of FIG. 1 taken along a radial plane passing through the line 11—11 of FIG. 1.
Figure 3:
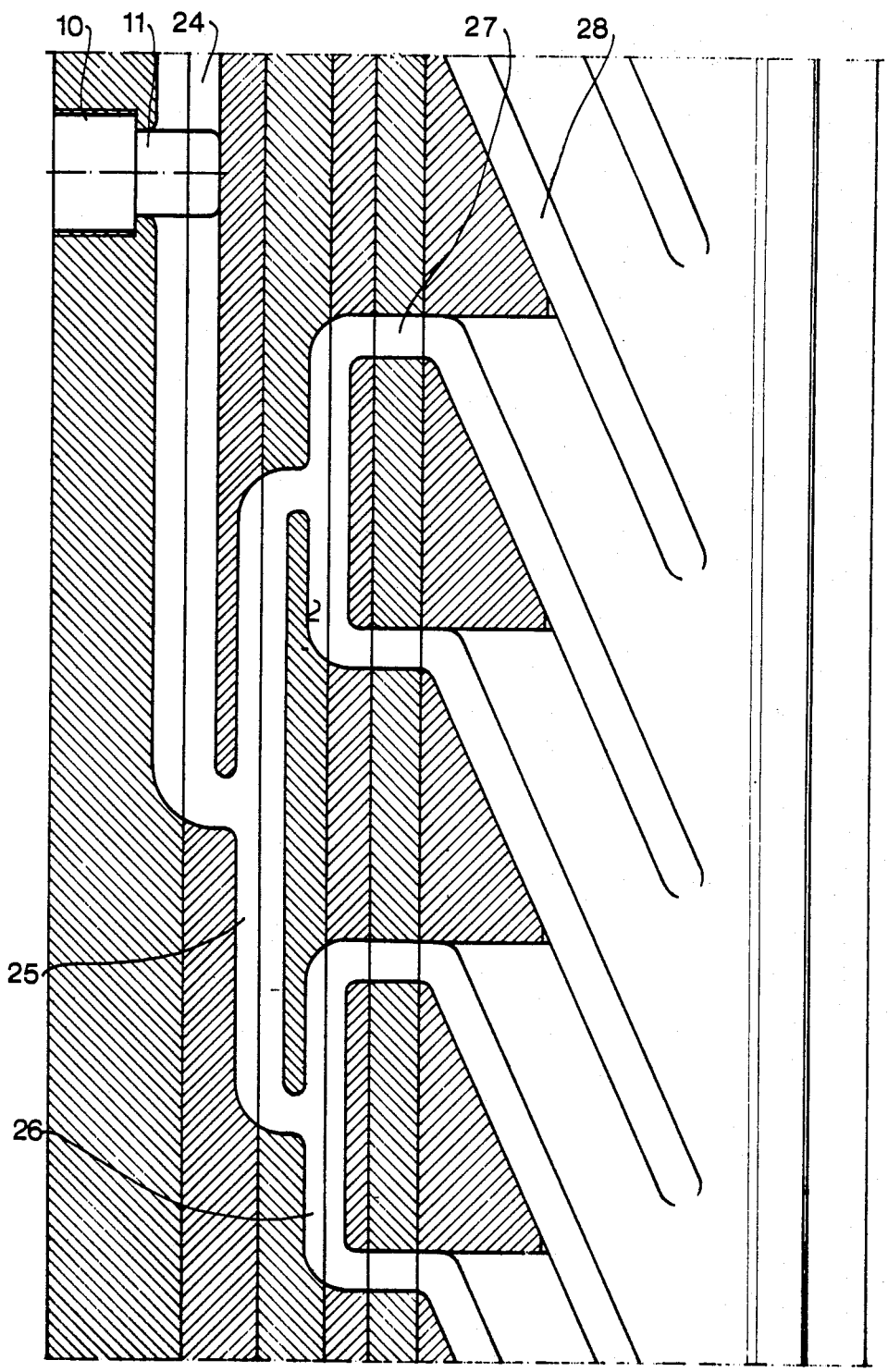
FIG. 3 is a part of the distribution channel system of the extrusion die of FIG. 2 shown in unfolded view.

FIGS. 2 and 3 shows the extrusion die of FIG. 1 in enlarged scale. The supply conduit 2 which has one end inserted in a hole 10 in the end of the extrusion die 1 communicates with the middle of the three distribution channel systems through a channel 11. The rear end of the extrusion die to which the extrudable materials is fed is composed of axially stacked plate elements 12–15 which are clamped together and also attached to the front end 16 of the extrusion die by clamping bolts 17 which are screwed into threaded holes in front end 16. Three collecting chambers 18–20 are provided in said front end, one end of each collecting chamber communicating with a distribution channel system and the opposite ends of collecting chambers 18–20 being connected to the annular extrusion slot 5.

The location of the extrusion slot 5 and consequently the thickness of the extruded tubular film is adjustable by means of adjusting screws 21 and 22.

In the embodiment illustrated in FIG. 2 the extrusion die is provided with electric heating jackets 23 on both the exterior and interior surfaces thereof.

The three distribution channel systems are in principle identical and only the middle system will be described with reference to FIG. 3.

The channel 11 connecting the supply conduit 2 with the distribution channel system opens into the middle portion of a first arched distribution channel 24. Each end of channel 24 is connected to the middle portion of a second group of arched distribution channels 25. The ends of channels 25 are in turn connected to the middle portion of a third group of arched distribution channels 26. The ends of the distribution channels are connected to the collecting chamber 19 through connecting channels 27.

In order to obtain a good distribution of the partial streams leaving the channels 27, guide grooves are provided in the wall of the collecting chamber 19, these guide grooves 27 being inclined relative to the longitudinal axis of the die and having a depth which gradually decreases.

Figure 4:
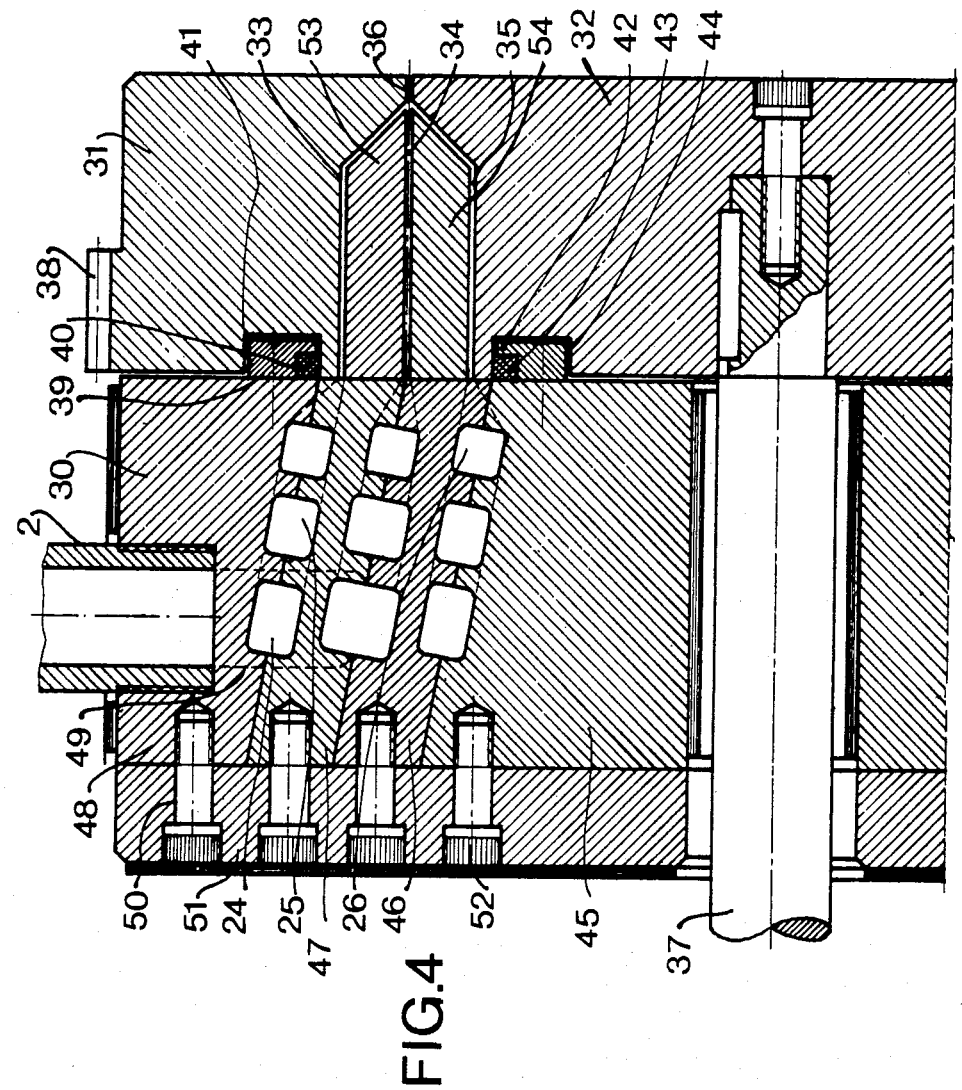
FIG. 4 is a longitudinal sectional view of part of another embodiment of the extrusion die according to the invention.

The extrusion die illustrated in FIG. 4 consists of a stationary part shown generally as 30, two rotatable parts 31 and 32 and located between parts 31 and 32 three collecting chambers 33, 34 and 35, each being connected to an annular extrusion slot 36.

The rotatable part 32 is mounted on a central shaft 37 cooperating with driving means (not shown) mounted in a central bore in the stationary part 30 of the die. The exterior surface of the rotatable part 31 has the shape of a toothed wheel which is in engagement with a pinion (not shown).

A guide ring 39 with a washer 40 attached to the stationary part 30 is inserted in an annular guide groove 41 in the rotatable part 31. Similarly a guide ring 42 with washer 43 which are also attached to the stationary part 30 are inserted in an annular guide groove 44 in the rotatable part 32.

The distribution channel system of the die illustrated in FIG. 4 corresponds to that of FIGS. 2 and 3 but the arched distribution channels 24, 25 and 26 are composed of grooves which are provided in the conical surfaces of an inner element 45 and two surrounding conical shells 46 and 47 as well as an outer shell 48 which has a conical inner surface, and a channel 49 connecting a supply conduit 2 with the first arched channel 24.

The elements 45–48 containing the distribution channel system are clamped together by a plate 51 comprising a set of holes 50 and bolts 52 which are inserted in said holes 50 and attached to the elements 45–48. Due to the conical shape of the contact surfaces of the elements 45–48 only a small force and consequently relatively thin and short bolts are required to clamp together the portions forming the stationary part of the die.

The space between the outer rotatable part 31 and the inner rotatable part 32 comprises two elements 53,54 of which one 53 by means of fastening means (not shown) having a small cross-sectional area is connected to the rotatable part 31 and the second one 54 by means of similar fastening means (not shown) is connected to the other rotatable part 32.

When using the embodiment of the die illustrated in FIGS. 2 and 3, the streams flowing out of the channels 27 are smeared out during the passage through the zone in which the guide grooves 28 are provided.

In the embodiment illustrated in FIG. 4 the streams are smeared out as a result of the movement of the rotatable parts 31, 32. These parts can be rotated in opposite directions (contrarotated) or in the same direction at different or equal speeds of rotation. Alternatively, one part can be rotated while the other part is stationary.

It should be understood that the embodiment illustrated in FIGS. 2 and 3 also might comprise rotatable die parts and that guide grooves also might be provided in walls of the collecting chambers illustrated in FIG. 4.

The embodiments of the extrusion die shown in the drawings are designed for the manufacture of laminates consisting of three layers disposed parallel to the surfaces of the laminates. However, if the extrusion die shown is modified such that one or two distribution channels systems open into the same collecting chamber, products could be manufactured wherein segments of the extrudable materials are located side by side in one or more layers or extending from one surface to the opposite. Such a modified embodiment of the extrusion die according to the invention would be suitable for the manufacture of products of the type disclosed in U.S. Pat. Nos. 3,565,744, 3,505,162, 3,632,282 and 3,690,982 and part of the extrusion die of the invention which comprises the distribution channel system could be combined with the apparatus described in said U.S. patent specifications.

We claim:

1. An extrusion die for the coextrusion of plural plastic materials into the form of a tubular film, said die comprising: (A) means for separately supplying at least two extrudable plastic materials in a fluid state; (B) a material distribution section comprising an array of annular elements providing a plurality of pairs of mutually contacting surfaces, at least one of said surfaces of each pair being recessed to define a labyrinthine distribution channel system for each such material, each said system having an inlet opening connected to one of said supply means and dividing into generally oppositely directed peripherally extending passages terminating in axially extending connecting passages which in turn divide into generally oppositely directed peripherally extending passages terminating in axially extending connecting passages which in turn divide into oppositely peripherally extending passages terminating in axially connecting passages, the number of said passage divisions being sufficient to provide for each extrudable material an array of at least eight peripherally spaced apart connecting passages opening generally axially through an end wall of said distribution section, the plural distribution channel systems being arranged in radially displaced relation at different radial distances from the center axis of the extrusion die; (C) an extrusion die section having one end wall contacting said distribution section end wall and comprising a plurality of concentric generally annular elements including generally spaced parallel concentric surfaces adjacent pairs of which define at least one axially elongated generally annular collecting chamber in communication with the open ends of the arrays of said connecting passages from said distribution sections, at least one of said annular elements defining said collecting chamber being mounted for rotation about its axis relative to said material distribution section and relative to at least the other of said annular elements defining said chamber, a common continuous annular extrusion orifice opening through the opposite end wall of said die section and connecting with the downsteam end of each such annular collecting chamber; (D) mechanical engagement means uniting the annular elements of said distribution and extrusion die sections, respectively, and maintaining said sections together and at least one of said annular sections free for said relative rotation with said end faces in contact; and (E) means for rotating said at least one rotatably mounted annular element of said die section about its axis relative to said distribution section and relative to said at least one other annular element.

2. An extrusion die as in claim 1 wherein said parallel concentric surfaces of said concentric generally annular elements in said die section define a plurality of said collecting chambers, one for each of said extrudable materials, which chambers have their interior ends opening through said die section end wall in direct communication with the open ends of the corresponding array of connecting passages from said distribution sections, and including delivery passage means connecting the downstream ends of said plural collecting chambers with said common extrusion orifice.

3. The extrusion die of claim 2 wherein said delivery passage means merges the ends of said plural collecting chambers upstream of said extrusion orifice to form a common slot-like passageway stretching from said merger point to said extrusion orifice.

4. An extrusion die as in claim 1, characterized in that the distribution channel systems are disposed in concentric relationship.

5. An extrusion die as in claim 1, characterized in that said distribution section is composed of annular elements which are clamped together (12-15, 45-48) and that both surfaces of said elements are recessed to define said passages.

6. An extrusion die as in claim 5, characterized in that the elements (12-15) are disc-shaped and that the axial passages (27) extend through the intervening dis-shaped elements (12-15) while said peripheral passages are formed in at least one face thereof.

7. An extrusion die as in claim 5, characterized in that said part of the die comprises annular frusto-conical elements (45-48) nestled together and that the distribution passages are formed from recesses provided in at least one surface of each frusto-conical element.

8. An extrusion die as in claim 5, characterized in that at least one wall of each collecting chamber (33-35) is rotatable relative to the distribution section.

9. An extrusion die as in claim 1 including sealing means disposed between the end walls of said distribution and die sections to permit relative rotation to said rotatable element.

10. An extrusion die as in claim 7 wherein said mechanical engagement means comprises a common supporting plate for said annular frusto-conical elements disposed at one end thereof and means for anchoring said elements to said plate in nestled relation.

* * * * *